United States Patent [19]
Williams

[11] Patent Number: 5,109,213
[45] Date of Patent: Apr. 28, 1992

[54] TIRE PRESSURE MONITOR

[76] Inventor: John J. Williams, 5890 Boeta Ct., Paradise, Calif. 95969

[21] Appl. No.: 726,358

[22] Filed: Jul. 5, 1991

[51] Int. Cl.$^5$ ............................................. B60C 23/00
[52] U.S. Cl. .................................. 340/447; 73/146.5; 200/61.22; 340/442
[58] Field of Search ............... 340/539, 447, 442, 445; 73/146.4, 146.5; 116/34 R; 200/61.22, 61.25

[56] References Cited

U.S. PATENT DOCUMENTS

| | | | |
|---|---|---|---|
| 2,860,321 | 11/1958 | Strickland et al. | |
| 4,237,728 | 12/1980 | Betts et al. | 340/447 |
| 4,286,253 | 8/1981 | Nagy | 200/61.25 |
| 4,311,985 | 1/1982 | Gee et al. | 340/539 |
| 4,334,215 | 6/1982 | Frazier et al. | 340/447 |
| 4,717,905 | 1/1988 | Morrison, Jr. et al. | 73/146.5 |
| 4,978,941 | 12/1990 | Brown | 340/447 |
| 5,001,457 | 3/1991 | Wang | 340/447 |
| 5,025,244 | 6/1991 | Huang | 340/447 |

Primary Examiner—Jin F. Ng
Assistant Examiner—Brent A. Swarthout

[57] ABSTRACT

A tire pressure range monitoring apparatus or system for sensing high and low tire air pressures outside assigned limits and communicating information regarding tire pressure to an operator of a vehicle. The tire pressure monitor is comprised of a battery powered wheel attachable unit having high and low tire pressure sensors with electrical switches; a digital encoder activated by the pressure sensors; a pressure change restrictor for preventing transitory air pressure changes from activating the pressure sensor switches; and an RF transmitter and antenna for transmitting digital information. A vehicle attachable unit for receiving and processing the digital information is attachable to the vehicle remote of the wheel, and is comprised of an RF receiving antenna; an RF receiver; a digital decoder; and a display controller. One vehicle attachable unit may function with a plurality of wheel attachable units on a given vehicle. A visual display in communication with the vehicle attachable unit is located convenient to the vehicle operator, and will display for the operator an anomaly sensed in tire pressure, and precisely identify the tire and pressure condition of the tire involved. False alarms are essentially eliminate through the use of digital information pertaining to a particular tire, and through a required match in digital source identification information between wheel attachable units of a given vehicle with a vehicle attachable unit of the same vehicle prior to the vehicle attachable unit fully responding and sending information to the visual display.

6 Claims, 10 Drawing Sheets

TIRE PRESSURE MONITOR

BACKGROUND OF THE INVENTION

1. Field of the Invention

This invention relates to safety, operating cost, planned maintenance and/or repair of vehicles using pneumatic tires. The present invention more particularly relates to systems and devices for sensing air pressure in pneumatic tires of a vehicle, and to tire pressure monitors of the type which are capable of sensing incorrect pressure and alerting the operator of a vehicle of incorrect tire pressure while the vehicle is being operated.

2. Description of Prior Art

A past art search was conducted at the U.S. Patent and Trademark Office to examine known tire pressure monitors. The following U.S. Patents disclose tire pressure monitors considered pertinent to my invention:

A patent issued to T. A. Gee et al in Jan. 1982, U.S. Pat. No. 4,311,985, discloses a tire pressure monitor and de-energization circuit therefore. The Gee et al patent discloses a device which is activated by a centrifugal switch when the vehicle moves and then continuously monitors the tire air pressure. The Gee et al device further utilizes a receiver in the passenger compartment which receives pulsed signals from a transmitter, and by counting the pulsed signal determines the tire pressure condition. The Gee et al device samples the tire pressure only when the pressure exceeds a preset value and notes the condition to the operator. False alarms and radio interference do not appear to be adequately addressed, and consequently false signals are seen to be a likely problem in the Gee et al device.

A patent issued to D. M. Brown in Dec. 1990, U.S. Pat. No. 4,978,941, discloses a low tire pressure detector. This device is hub mounted and uses a transmitter/receiver to send a low pressure alert signal to the operator. The device senses a low pressure signal from a low pressure switch and transmits this signal to the operator. The operator may then stop the vehicle and by inspecting each individual wheel, determine which tire has the under pressure condition. An indicator is located on each wheel to assist the operator in determining the low pressure tire. Isolation from other vehicles to reduce the number of false signals is obtained only partially through delay logic, and consequently, false alarms with this device are seen to be a likely relatively frequent problem.

A patent issued to A. N. Strickland et al in Nov. 1958, U.S. Pat. No. 2,860,321, discloses a tire alarm system, which senses both high and low tire pressure. The Strickland et al system uses pressure sensors and radio transmitters and receivers to notify the operator of a high or low pressure condition. The method of signaling is by transmitting a given frequency for each tire. Interference between vehicles equipped with this device does not appear to be adequately addressed, and consequently, false alarms are also seen to be a likely problem with this system.

A patent issued to C. F. Morrison Jr. et al in Jan. 1988, U.S. Pat. No. 4,717,905 discloses a warning system for tire air pressure including means for remotely energizing a sensing device. Several means are discussed including using RF transmission, through a receiving antenna and capacitors which will store the received power and supply this power to the pressure sensors and transmitter which transmits to the receiver the status of the tire. The system appears to use a pressure transducer to transmit the actual tire pressure when activated. The data is transmitted at a different frequency for each tire or set of tires. Also described is the use of tuned antennas which are affected by tire pressure which results in changed antenna impedance which in turn indicates a tire pressure. Calibration of the antennas would give information on pressure changes. The devices described in this patent use radio frequency devices and antenna responses primarily to detect tire anomalies.

A patent issued to E. J. Nagy in Aug. 1981, U.S. Pat. No. 4,286,253, discloses a tire pressure sensing and alarm system. The Nagy device uses a radio transmitter and radio receiver activated by a low pressure switch which causes a transmitter to transmit to a receiver which then presents an audio or visual display to the operator. The operator may then stop the vehicle and inspect each wheel to determine the particular wheel on which the low pressure tire is located. Nagy does not appear to address false signals or radio interference.

The tire pressure monitors of the prior art are similar, and to the present invention for that matter, typically including pressure sensors or pressure transducers, radio or infrared transmitters and receivers, and displays or alarms to alert the vehicle operator of a problem in tire pressure. Each of the prior art tire pressure monitors seem to have one or more undesirable attributes which may explain the apparent general absence of the use of such devices, and indicate there exists a need for an improved tire pressure monitor or monitoring system. Some of the problems found in the prior art devices include the monitoring of low tire pressure only; the lack of adequate structuring to safe guard against internally generated false signals and false signals caused by other vehicles having similar tire pressure monitors; the problem of requiring visual inspection of each wheel to determine which tire has an incorrect air pressure; and excessive use of battery power.

SUMMARY OF THE INVENTION

The present invention is an improved tire air pressure monitor or monitoring system that will sense tire air pressures above and below an acceptable value and inform the vehicle operator of the particular tire or tires involved including the high or low pressure condition of the involved tire(s) without the vehicle operator having to inspect each wheel. Additionally, my tire pressure monitor is structured to be easily maintained; is modular in construction; and operates in a manner which minimizes battery power use. My invention is additionally structured to notify the operator if a low battery condition exists, and may be tested by the user for operational status. My invention further eliminates the false signal problem resulting from radio frequency interference and/or from other tire monitoring sources as well as transient air pressure changes resulting from operating conditions.

The preferred structure of the present invention does not require removal of the tire from the rim or wheel for installation or maintenance, and the pressure settings or values at which the pressure sensors initiate information transmitting may be adjusted by the user to a particular desired tire pressure operating range.

Additionally, the primary electronics and electrical circuits which may be advantageously utilized in the present invention are known and readily available. This being particularly evident in the electric-powered garage door and wireless security monitor industries where digital electrical circuitry to essentially eliminate false signals has been developed and put into wide use with excellent results.

My invention includes a battery powered wheel attachable unit. One wheel attachable unit is utilized for each tire to be monitored. The wheel attachable unit is comprised of a protective housing containing high and low tire pressure sensors each with electrical switches or contacts; an air flow or pressure change restricting arrangement for preventing transitory air pressure changes within a tire from activating the pressure sensor electrical contacts; a digital encoder activated or initiated by electric current passed through the contacts of the pressure sensors; and an RF (radio frequency) transmitter and antenna for transmitting digitally encoded binary information in the 360 to 470 KHz band. The digitally encoded binary information preferably contains three distinct primary pieces of information which are: transmission source identification; wheel identification; and high or low air pressure status of the identified wheel. Additionally a forth piece of information is contained within and at the start of the RF transmission which is an alert signal which will be understood with further reading.

The present invention additionally utilizes a vehicle attachable unit for receiving and processing the digitally encoded information generated and transmitted by the wheel attachable unit(s). The vehicle attachable unit is powered by the vehicle electrical system, although any suitable electrical powering source might be used. The vehicle attachable unit is attachable to the vehicle remote of the wheels, and is comprised of an RF receiving antenna; an RF receiver; a digital decoder; a power supply; and a display controller for driving a visual display placed convenient to the vehicle operator. A single vehicle attachable unit may function with a plurality of wheel attachable units on a given vehicle. The visual display is in communication with the vehicle attachable unit most directly by way of electrical conductors, and will display for the operator an anomaly sensed in tire pressure. An audible alert tone may also be used to draw the attention of the vehicle operator to the visual display when information pertaining to a tire is being displayed.

With the present invention, false alarms are essentially eliminated through the use of digital encoding and decoding of information; bit assignments pertaining to each particular tire, and further through a required match in digital transmission source indicating information between wheel attachable units on a given vehicle with a vehicle attachable unit on the same vehicle prior to the vehicle attachable unit fully electronically responding to a signal and sending information to the visual display in the vehicle.

The invention may be shipped in ready-to-install kit form, wherein the individual components have been previously factory set and labeled for simple installation on a vehicle having a designated number of wheels (tires) to be monitored. Alternately, the invention may be shipped from the factory in a condition allowing field setting of DIP switches by the user during installation to meet the user's unique requirements. With the process of field setting of DIP switches, each tire of a given vehicle is initially assigned a wheel number by the user, and a digital wheel identification code is set in the wheel attachable unit of the wheel that is assigned that wheel number. The digital wheel identification code is assigned by the user initially setting wheel identification DIP switches located on each wheel attachable unit of the vehicle. Each wheel attachable unit on a single vehicle will have the wheel identification DIP switches set differently from the other wheel attachable units on that particular vehicle so digital information identifying the particular wheel of that vehicle having incorrect pressure may be transmitted by the wheel attachable unit affixed to the wheel (tire) having incorrect air pressure. For example, a vehicle having four tires being monitored will have a wheel attachable unit on each wheel, with each wheel having been initially assigned a different wheel number 1 through 4 by the user, and each wheel attachable unit having the wheel identification DIP switches set to provide for digital information representative of the wheel number to be transmitted in the event of incorrect tire air pressure. This transmitted digital information containing information identifying the particular tire with incorrect pressure, ultimately will be displayed for the vehicle operator in a manner indicating a wheel number, 1, 2, 3, or 4. Also, through preset bit assignments in the wheel attachable units and vehicle attachable units, the vehicle operator will additionally receive information pertaining to the wheel number identified on the visual display which will indicate whether the identified wheel (tire) has unacceptable high or low air pressure so the vehicle operator may take corrective action before a complete tire failure or in the event of a tire failure may take action as required.

The required match in digital transmission source indicating information between wheel attachable units on a given vehicle with a vehicle attachable unit on the same vehicle is also initially user set through a plurality of source identification DIP switches located on each wheel attachable unit, and also located on the vehicle attachable unit. Each tire in which the tire pressure of a given vehicle is to be monitored receives a wheel attachable unit, with each wheel attachable unit having the source identification DIP switches all set identically on that vehicle, and the same vehicle receives a single vehicle attachable unit with the source identification DIP switches of the vehicle attachable unit set identically to all of the wheel attachable units on that vehicle. The settings of the source identification DIP switches of the wheel attachable units determine part of the digital information transmitted by the wheel attachable units to the vehicle attachable unit on the vehicle when a tire pressure problem is sensed. If the source identification DIP switches of the vehicle attachable unit are not set the same as a transmitting wheel attachable unit, the vehicle attachable unit will not electronically recognize the signal as being proper, and thereby unrecognized signals will not cause the vehicle operator to receive a false display. A vehicle attachable unit may receive incompatible or undesirable signals from sources such as a wheel attachable unit having a different setting on the source identification DIP switches, which may be on an adjacent vehicle also utilizing my invention. The source identification DIP switch settings will allow the vehicle attachable unit on a given vehicle to determine by comparison whether a signal is from a wheel attachable unit on that vehicle or some other vehicle.

This wheel identification and separate source identification system is easily accomplished utilizing digital information transmitted and received, and bit assignments to essentially eliminate false information from being displayed to the vehicle operator. Additionally, since the wheel and the source identification DIP switches may be set in the factory or user set in the field, all of the wheel attachable units may be advantageously manufactured identically to one another, and all of the vehicle attachable units may be manufactured identically to one another which contributes in minimizing the purchase cost to the end user.

It should be noted that a tractor and trailer are treated as two separate vehicles, although only one visual display will be positioned convenient to the vehicle operator. If the tractor is towing two trailers, then the arrangement is treated as three vehicles. By treating the tractor and the trailer(s) as separate vehicles, trucking companies utilizing the present invention on all of their tractors and trailers will have the freedom to attach any of their trailers to any of their tractors without confusion between the wheel attachable units and vehicle attachable units, and may implement this interchangability without resetting any of the DIP switches, due to the source identification DIP switches being set differently on each vehicle. Spare tires may be monitored if desired.

BEST MODE FOR CARRYING OUT THE INVENTION

Figure 1:
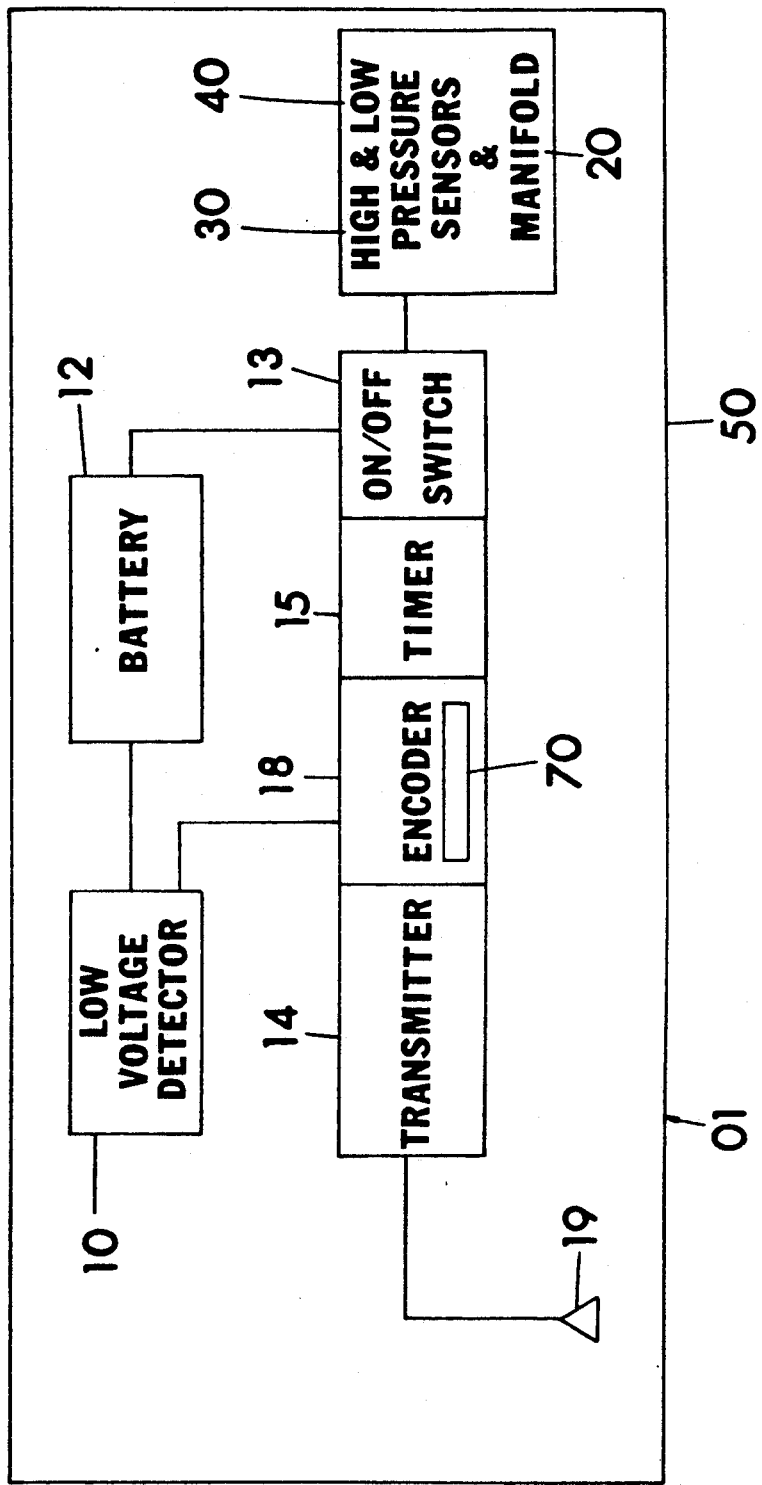
FIG. 1 is a block diagram illustrative of the primary electrical and some mechanical components of the battery powered wheel attachable unit in accordance with the immediate invention.

The drawing figures, in general, illustrate the optimum mode for implementing the invention. FIG. 1 shows a schematic functional block diagram of a wheel attachable unit 01. Wheel attachable unit 01 includes a manifold 20, high pressure sensor 30 and low pressure sensor 40, a battery 12, and operational circuits and electronics all contained within a protective housing 50. Components for communicating tire air pressure to pressure sensors 30 and 40, namely valve extension tube 55, valve stem tee adapter 56 and any components associated therewith may be considered part of wheel attachable unit 01. High pressure sensor 30 by sensing high tire pressure, or low pressure sensor 40 by sensing low tire pressure will cause either shunt elements 31 or 41 to move and close switch contacts 39 or 49 which in turn will apply electrical power from a 9 volt alkaline battery 12 to the timer 15 and encoder 18. A five second timer 15 is located in series with ON/OFF switch 13 and after the contacts 39 or 49 of the pressure sensors 30 or 40 have been closed and the circuit completed, will immediately send to encoder 18 electrical power from battery 12. Upon receipt of electrical power, encoder 18 will then generate proper digitally encoded information and communicate the information to transmitter 14 to be transmitted by RF transmission via antenna 19. Antenna 19 is a short fixed wire antenna contained in housing 50. Antenna 19 allows RF radiation from transmitter 14 to be transmitted. Transmitter 14 will transmit RF signals in the 360 to 470 KHz frequency band using frequency shift keying (FSK), although other modulation modes could be used. The nominal transmitter 14 range is 20 feet, however the range could vary based on design choice. After the first transmission from transmitter 14, timer 15 will "clock down" and allow the digitally encoded information to be transmitted at five second intervals, and will continue in this mode until battery 12 power is exhausted or the tire pressure has been brought to normal and contacts 39 or 49 again opened by the normal pressure. Timer 15 extends operating life of battery 12 and improves operation of the system, as will be understood with continued reading. OFF/ON switch 13 is used to turn the power consuming electronic of wheel attachable unit 01 on or off for maintenance, changing encoder 18 settings, changing tires 102 or for any reason required.

Figure 10:
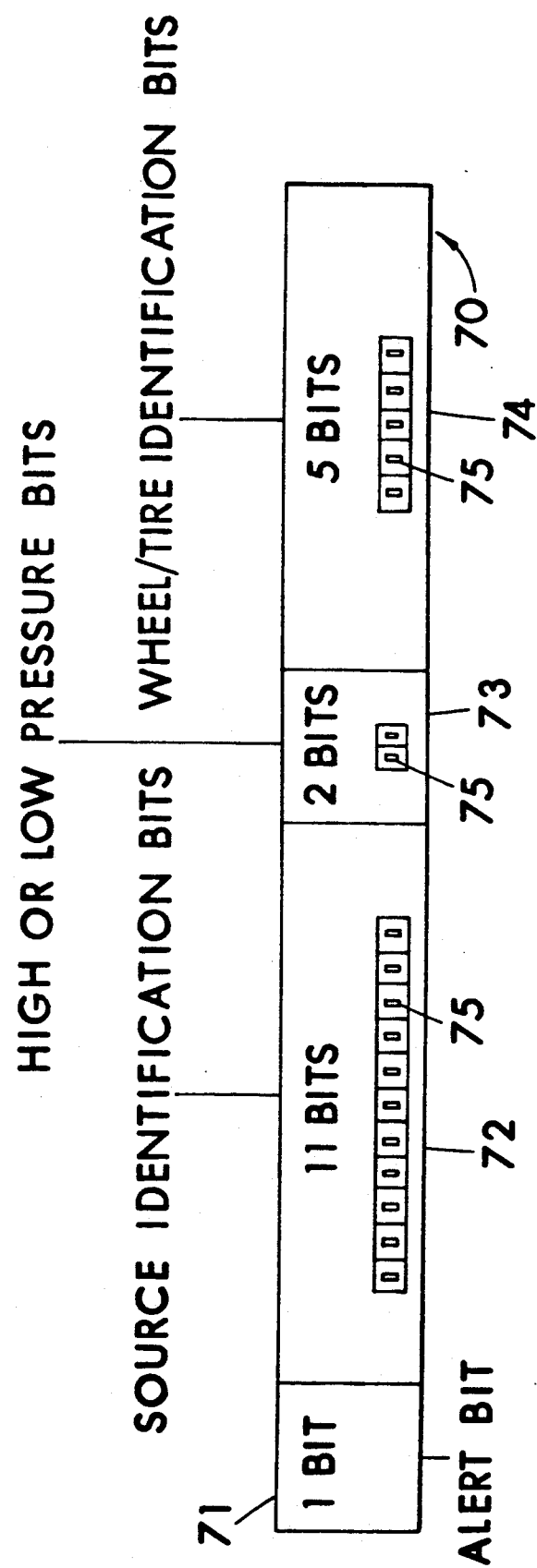
FIG. 10 is illustrative of a 19 bit information code DIP switch buss, the bit assignments, and the DIP switches in accordance with the immediate invention.

Encoder 18 includes a DIP switch buss 70 with a plurality of two-position DIP switches 75 shown in FIG. 10 and indicated in FIG. 1. Encoder 18 with DIP switch buss 70 has factory or user preset electronic functions, bit assignments and a bit string generation for alert 71; transmission source identification 72; high or low pressure status 73; and wheel identifications 74 which will be further discussed later. These functions are either permanently set in the factory or set with DIP switches 75 in the factory or in the field. Interface electronics between encoder 18 and transmitter 14 are also included. High or low pressure status 73 functions to generate either a high pressure code or low pressure code, and also functions in an alternate mode in conjunction with low voltage detector 10 to indicate low voltage in battery 12.

Figure 11:
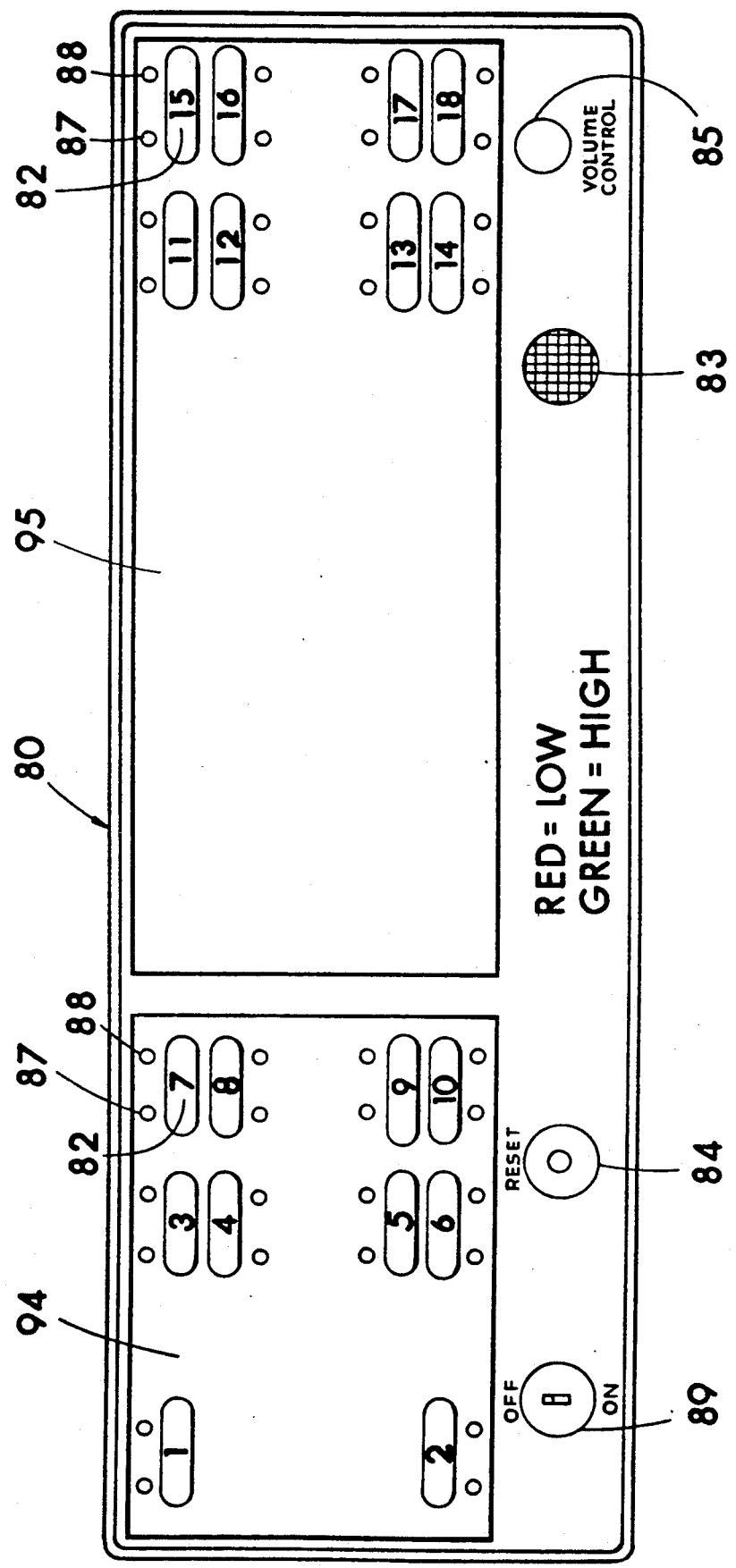
FIG. 11 is illustrative of a suitable visual display for use with the present invention.

Low voltage detector 10, upon sensing low voltage in battery 12, switches power from battery 12 to encoder 18. Encoder 18 then generates information identifying the wheel 100 to which the wheel attachable unit 01 is attached by its designated wheel number, the transmission source, and information representing both a high and a low pressure condition of the identified wheel (tire). Encoder 18 then communicates this information to transmitter 14 for RF transmission to vehicle attachable unit 60. Vehicle attachable unit 60 will be explained later in detail, as will display 80. Vehicle attachable unit 60 does however contain electronic components and circuits which will receive, compare, process and communicate the information from wheel attachable unit 01 to display 80. This transmit mode of unit 01 will continue uninterrupted with high and low pressure status 73 segment of DIP switch buss 70 functioning in conjunction with low voltage detector 10 unit until the power of battery 12 is exhausted. The information communicated via vehicle attachable unit 60 to display 80 will cause the lighting of both a red LED 87 and green LED 88 both placed adjacent a wheel 100 on display 80. The lighting of one or both of the LEDs identifies a given wheel on display 80. The vehicle wheels 100 are individually shown on display 80 by a graphic wheel display containing an assigned wheel number therein, and is illustrated in FIG. 11 and designated with 82. The red LED 87 indicates low tire air pressure, and green LED 88 indicates high tire air pressure. Since a tire cannot simultaneously have both high and low air pressure, when both LEDs 87 and 88 associated with a wheel identified on display 80 are activated, the operator will be alerted that battery 12 in the wheel attachable unit 01 on the identified wheel 100 has low power and should be replaced or recharged. If wheel attachable unit 01 happens to be in the transmitting mode, that is, a low or high tire pressure condition has actually been identified by high or low pressure sensors 30 or 40, and a low battery condition occurs, the transmit mode will occur, however the high or low pressure status 73 segment of encoder 18 and DIP switch buss 70 functioning in conjunction with low voltage detector 10 will include upon recognition of low battery power, the signal to be transmitted to the vehicle attachable unit 60 that will cause the lighting of both a red LED 87 and green LED 88 adjacent an identified wheel on display 80. The vehicle operator should check the battery 12 and at the same time check the pressure of the identified wheel (tire) to be safe when both LEDs 87 and 88 associated with a wheel 100 identified on display 80 are activated.

The components of wheel attachable unit 01 are readily available. Conventionally, transmitter 14, encoder 18 with DIP switch buss 70 and antenna 19 are manufactured and procured as one integral unit from existing suppliers. Low voltage detector 10 may be procured from many sources. Battery 12 is readily available as is the ON/OFF switch 13. Encoder 18 with DIP switch buss 70 is in wide use in such applications as garage door opener controllers, wireless security monitors, toys and others, as is transmitter 14.

There are many existing variations of high and low pressure sensors with switches, contacts, or solid state components which could conceivably be utilized to sense pressure and effect electrical current in circuits.

Figure 2:
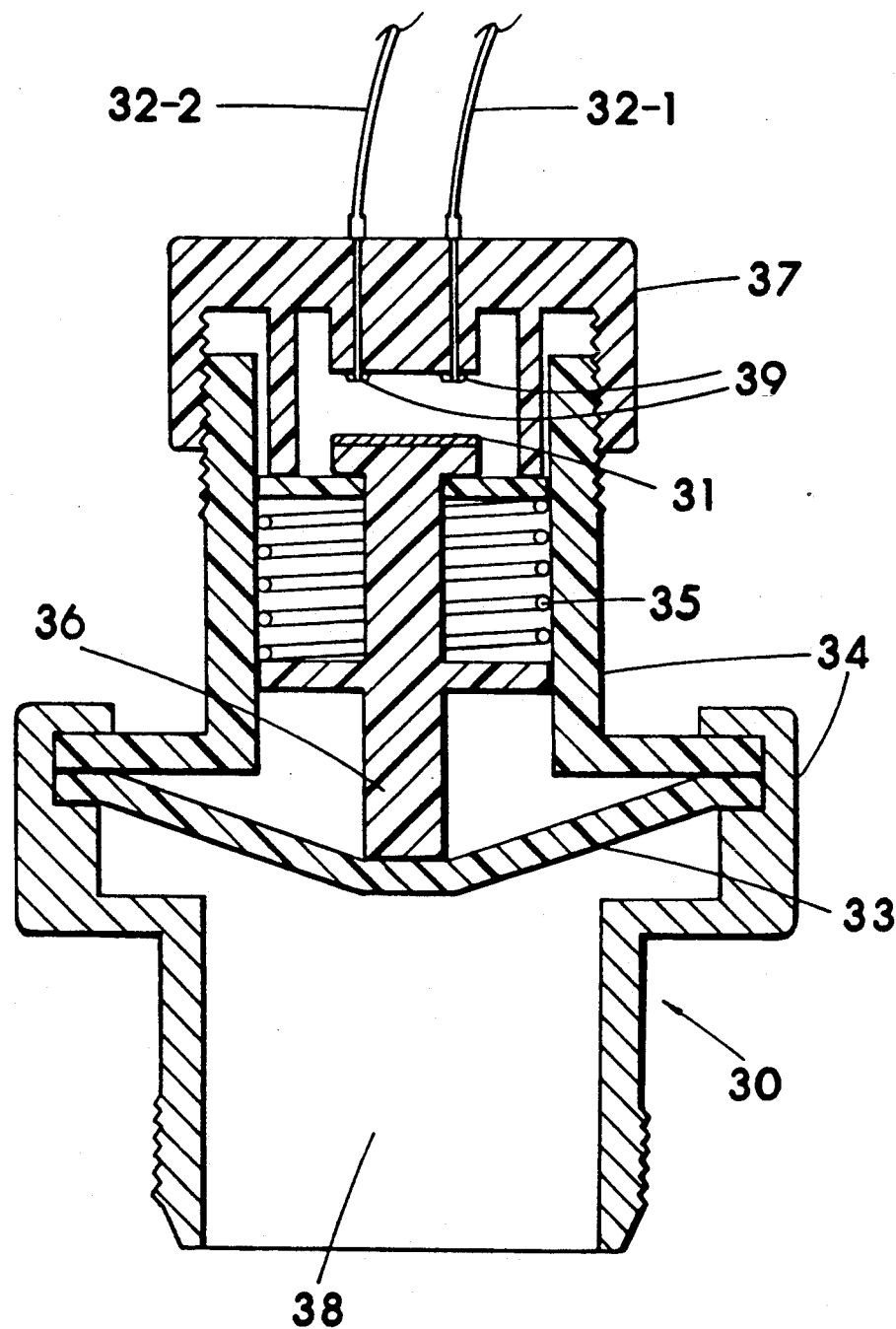
FIG. 2 is a cross sectional view of a suitable high pressure sensor with an electrical switch which may be utilized as part of the immediate invention to effect electrical current flow when exposed to overly high tire air pressure.

FIG. 2 shows a suitable high pressure sensor 30. High pressure sensor 30 is comprised of electrical power leads 32-1 and 32-2 connected one each to two electrical switch contacts 39 which upon excessively high pressure, shunt element 31 affixed to moveable piston 36 moves toward and closes contacts 39 to allow electrical power from battery 12 to energize timer 15, encoder 18 and transmitter 14 of wheel attachable unit 01. Other parts of high pressure sensors 30 are the rotatable pressure adjustment cap 37 supporting contacts 39 which by tightening will compress a pressure spring 35 requiring higher air pressure to move shunt element 31 to the point of closing switch contacts 39. Additional parts are housing 34, pressure diaphragm 33, piston 36 and plenum 38. If the air pressure were to increase in plenum 38, piston 36 would, through force of the air pressure acting on diaphragm 33, compress spring 35 and move shunt element 31 in closer proximity to contacts 39. When contacts 39 are connected by shunt element 31, electrical energy is caused to flow through wires 32-1 and 32-2. Only if the pressure exceeds the high pressure setting of sensor 30 will timer 15, encoder 18 and transmitter 14 of wheel attachable unit 01 be activated by high pressure sensor 30.

Significant forces, other than air pressure, acting on piston 36 and diaphragm 33, are perpendicular to the axis of the wheel 100. High pressure sensor 30 is mounted in wheel attachable unit 01, and wheel attachable unit 01 is mounted to a wheel 100 in a manner such that the axis of piston 36 is parallel to the axis of the wheel, thereby minimizing inertia and centrifugal forces acting on piston 36 and diaphragm 33 that might lead to a false closure of contacts 39.

Figure 3:
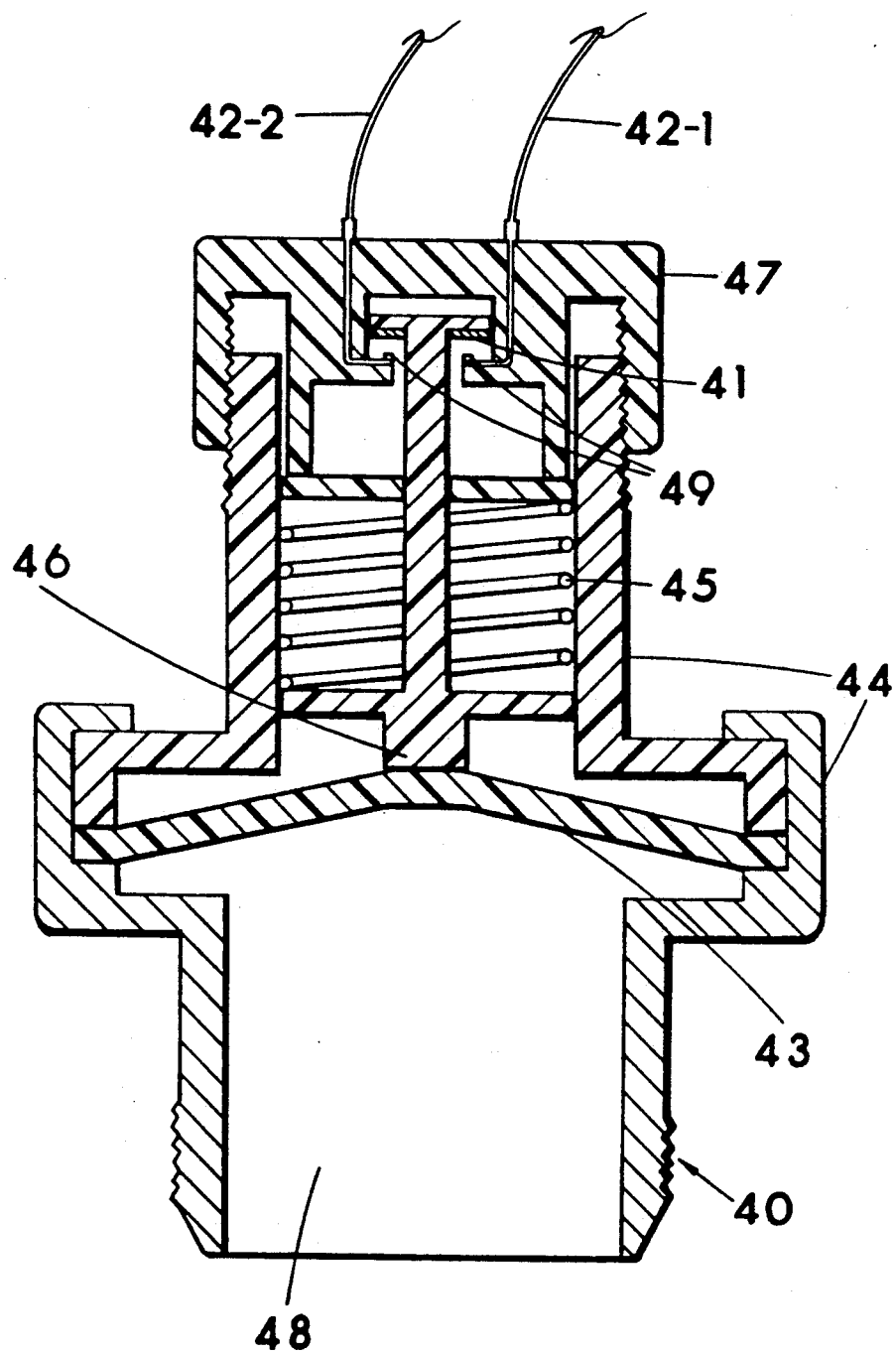
FIG. 3 is a cross sectional view of a suitable low pressure sensor with electrical switch which may be utilized as part of the immediate invention to effect electrical current flow when exposed to excessively low tire air pressure.

FIG. 3 shows a suitable low pressure sensor 40. Low pressure sensor 40 is comprised of electrical leads 42-1 and 42-2 connected one each to two electrical switch contacts 49. Upon sensor 40 being exposed to excessively low pressure, contacts 49 are connected by shunt element 41 allows electrical power from battery 12 to energize timer 15, encoder 18, and transmitter 14 of wheel attachable unit 01. Other parts of low pressure sensor 40 are the pressure adjustment cap 47 supporting contacts 49 which by tightening will compress the pressure spring 45 requiring lower pressure to move shunt element 41 to the point of contacting switch contacts 49. Pressure above a given level pressing against diaphragm 43 will hold shunt element 41 away from contacts 49. Additional parts are the pressure spring 45 which is used in conjunction with the pressure adjustment cap 47 to set response pressure, the housing 44, the pressure diaphragm 43, the piston 46, and the plenum 48. If the pressure were to decrease in plenum 48, piston 46 would, through the force of spring 45 acting on diaphragm 43, move toward plenum 48 and move shunt element 41 in closer proximity to contacts 49. When contacts 49 contact shunt element 41, electrical energy is caused to flow through wires 42-1 and 42-2. Only if the low pressure drops below the low pressure setting of sensor 40 will the timer 15, encoder 18 and transmitter 14 of wheel attachable unit 01 be activated by low pressure sensor 40. Low pressure sensor 40 is mounted with the piston 46 axis parallel to the wheel axis for the same reasons high pressure sensor 30 is mounted with the same orientation.

Figure 4:
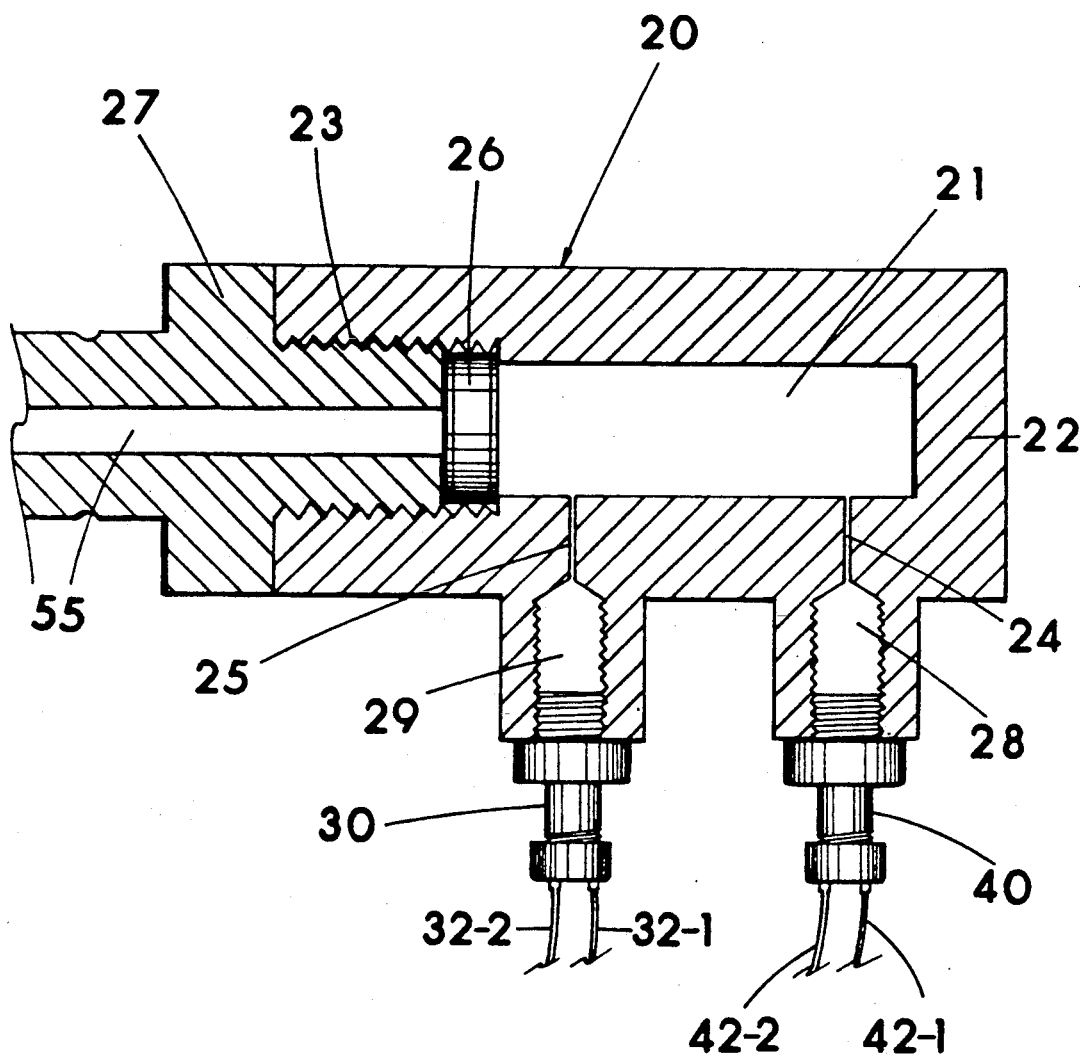
FIG. 4 shows the high pressure sensor and the low pressure sensor, with both pressure sensors connected to a cross sectioned air pressure manifold in accordance to the immediate invention. Further shown are small air flow restrictive orifices from the manifold to the pressure sensors.

FIG. 4 shows manifold 20 and high and low pressure sensors 30 and 40 attached to the housing 22 which defines manifold 20. Manifold 20 includes threaded receptacles 28 and 29 for threadably connecting pressure sensors 30 and 40, and a threaded receptacle 23 for threadably connecting adapter 27. Adapter 27 is for connecting one end of valve extension tube 55 to manifold 20, and the other end of valve extension tube 55 is connected to be in communication with tire pressure as will be further explained later. While attached to the adapter 27 by a fitting of any suitable type, a filter 26 is independent of the adapter 27 and may be changed as needed. The filter 26 is used to prevent small particles of foreign material from entering plenum 21 of manifold 20.

Restrictive flow orifices are shown in FIG. 4 as 24 and 25, and restrict transient tire air pressure changes from affecting the air pressure in the receptacles 28 and 29 as the small size of orifices 24 and 25 limits the flow of air from plenum 21 of manifold 20 to pressures sensors 30 and 40. The restrictive flow orifices 24 and 25 may be of a size about 1/32 of an inch in diameter, however this could vary based on design choice and the normal pressure range of the particular tire 102 being monitored. Orifices 24 and 25 equate pressure changes to a slow leak in a tire 102 and therefore will prevent pressure sensors 30 and 40 from responding to short term pressure transients which may be caused by the tire 102 hitting a chuck hole or leaving the ground. With orifices 24 and 25, in the event of a catastrophic change of air pressure in the tire 102, the system will still respond and alert the vehicle operator in approximately 15 seconds, however this could vary based on design choice.

Figure 5:
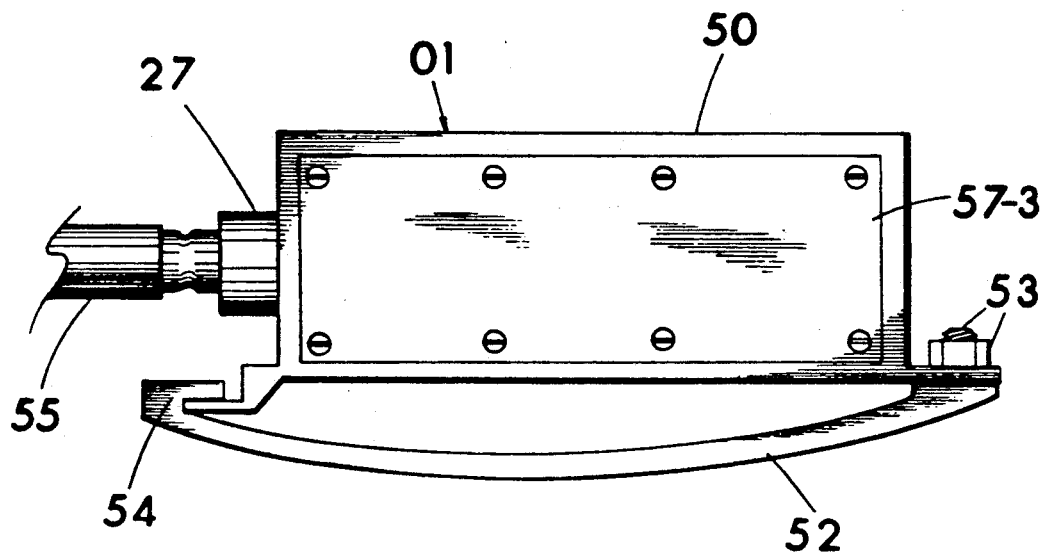
FIG. 5 is a side view of one possible mounting base and protective housing for protectively containing most of the components of the wheel attachable unit.
Figure 7:
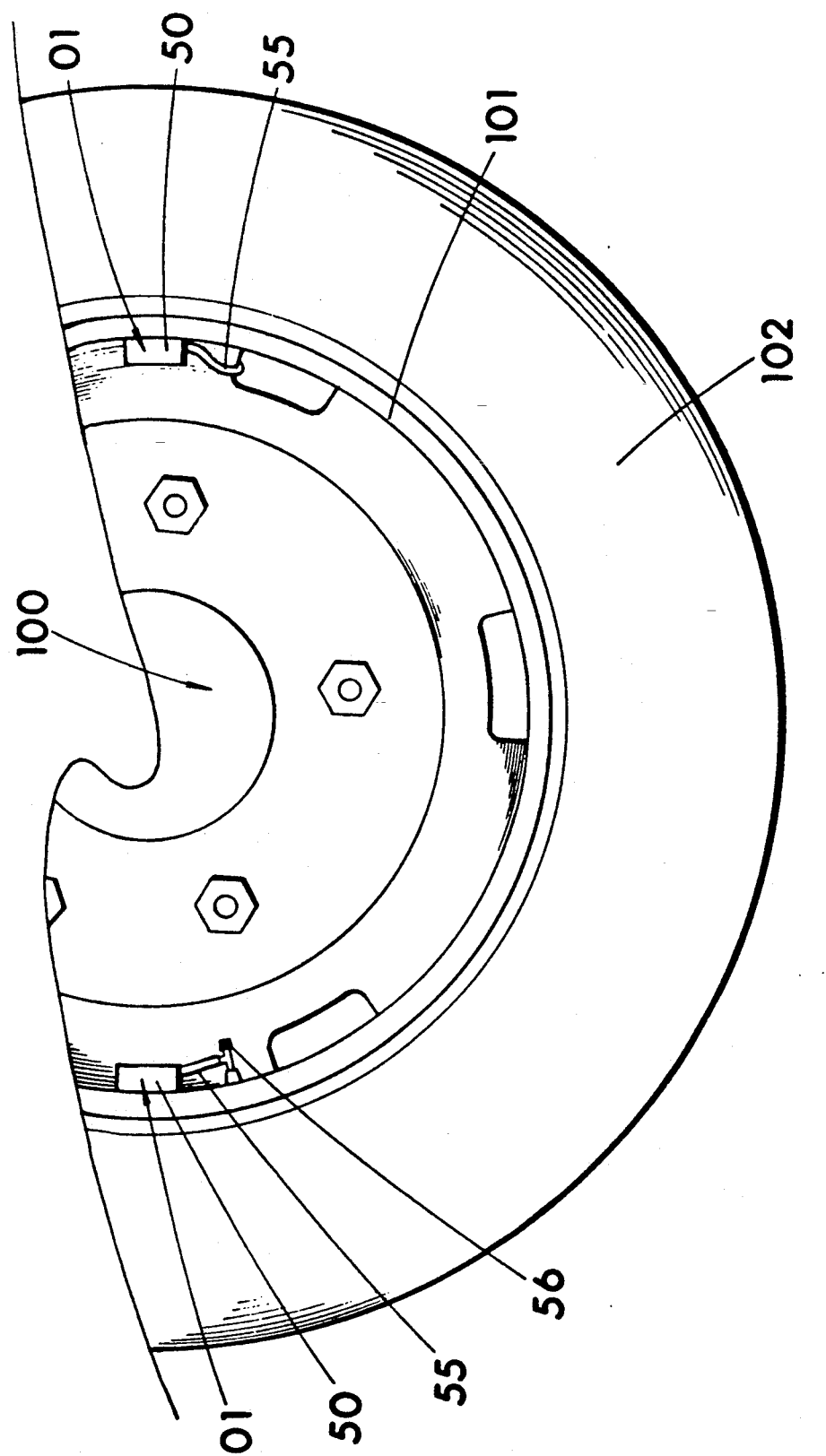
FIG. 7 is a partial view of a wheel with a pneumatic tire as part of a set of dual wheels common to large vehicles. Additionally shown are two wheel attachable units in accordance to the immediate invention mounted to the wheel and oppositely disposed from one another to help maintain wheel balance. One wheel attachable unit is for the outer shown tire, and the other is for the inner tire of the dual set as may be ascertained from FIG. 8.

FIG. 5 shows a side view of housing 50 that protectively contains some primary components of wheel attachable unit 01. Housing 50 is constructed primarily of corrosion resistant material, preferably metal, although other durable materials such as plastics might work suitably well. Adapter 27 connects to valve extension tube 55 which is an armored flexible tube which connects to a tee valve adapter 56 on the tire 102. Valve adapter 56 shown best in FIG. 7, is a tee fitting which may be threaded onto the existing tire valve stem once the valve has been removed from the valve stem. Adapter 56 has a conventional valve on the upper end to allow normal air pressure adjustments to be made to the tire 102, and the side tee portion of adapter 56 is in open communication with tire air pressure and valve extension tube 55 so as to be able to communicate tire pressure through manifold 20 with pressure sensors 30 and 40.

The wheel mounting adapter 52 shown in FIG. 5 is configured to adapt the housing 50 to the various sized wheels 100 of various manufacturers. There are a number of wheel manufactures and an equal number of adapters 52 may be required. The mounting adapter 52 can be either welded to the rim 101 of the wheel 100 or mechanically attached. The mounting adapter 52 has three integral threaded studs for passage through three apertures 51 on a flange of housing 50, which when combined with nuts shown on the studs at 53, and the oppositely disposed flange and groove interlock at 54 will secure housing 50 to mounting adapter 52.

Figure 6:
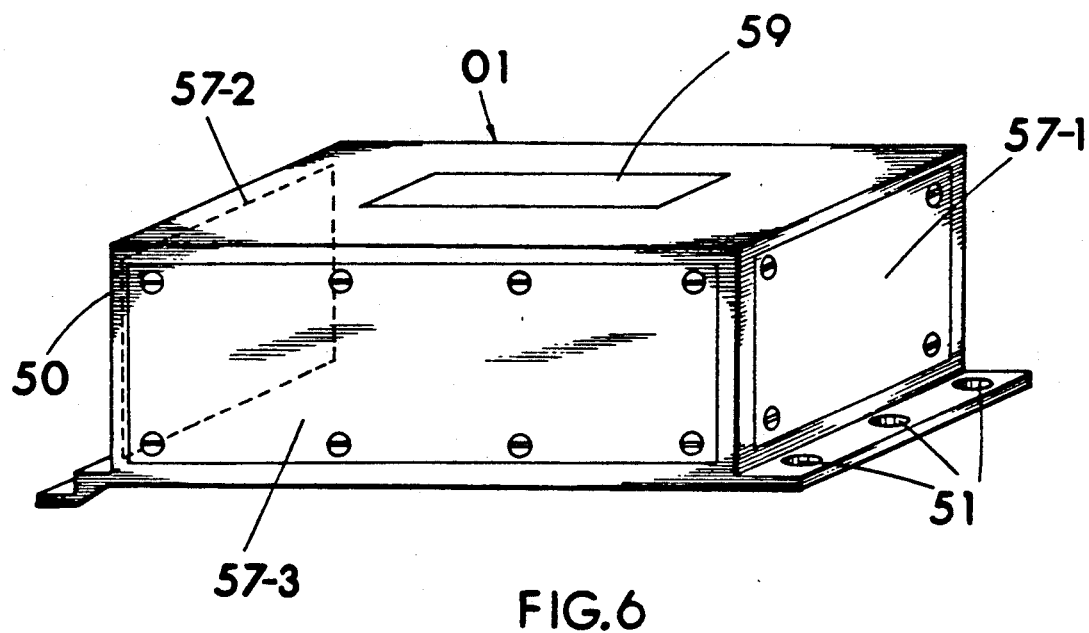
FIG. 6 is a perspective view of the protective housing of FIG. 2 showing removable panels which allow access to the DIP switches and replaceable battery therein.

FIG. 6 shows a perspective view of the housing 50. It includes an access plate 57-1 on the end to access battery 12, and a side access plate 57-3 on the outward facing side of the housing 50 to access the ON/OFF switch 13 and the DIP switch bus 70, and an access plate 57-2 to access pressure sensors 30 and 40 and filter 26. A plastic insert 59 over antenna 19 to allow RF transmitting is integral to housing 50 particularly if the housing 50 is generally made of metal.

FIG. 7 shows a typical wheel installation of wheel attachable unit 01 wherein valve extension tube 55 is running from the unit 01 to the valve adapter 56. Also shown is a second wheel attachable unit 01 which is connected via a valve extension tube 55 to a second wheel (tire) adjacent the shown wheel 100. The second wheel is the inner wheel (tire) of a set of duals, and it is more convenient to mount both wheel attachable units 01 to the rim 101 of the outer wheel 100. It is conceivable wheel attachable unit 01 could be mounted to the exposed center hub of wheel 100 or possibly elsewhere, and so for the purposes of this disclosure, wheel attachable unit 01 could be mounted to any rotating portion associated with the wheel or tire of a vehicle.

Figure 8:
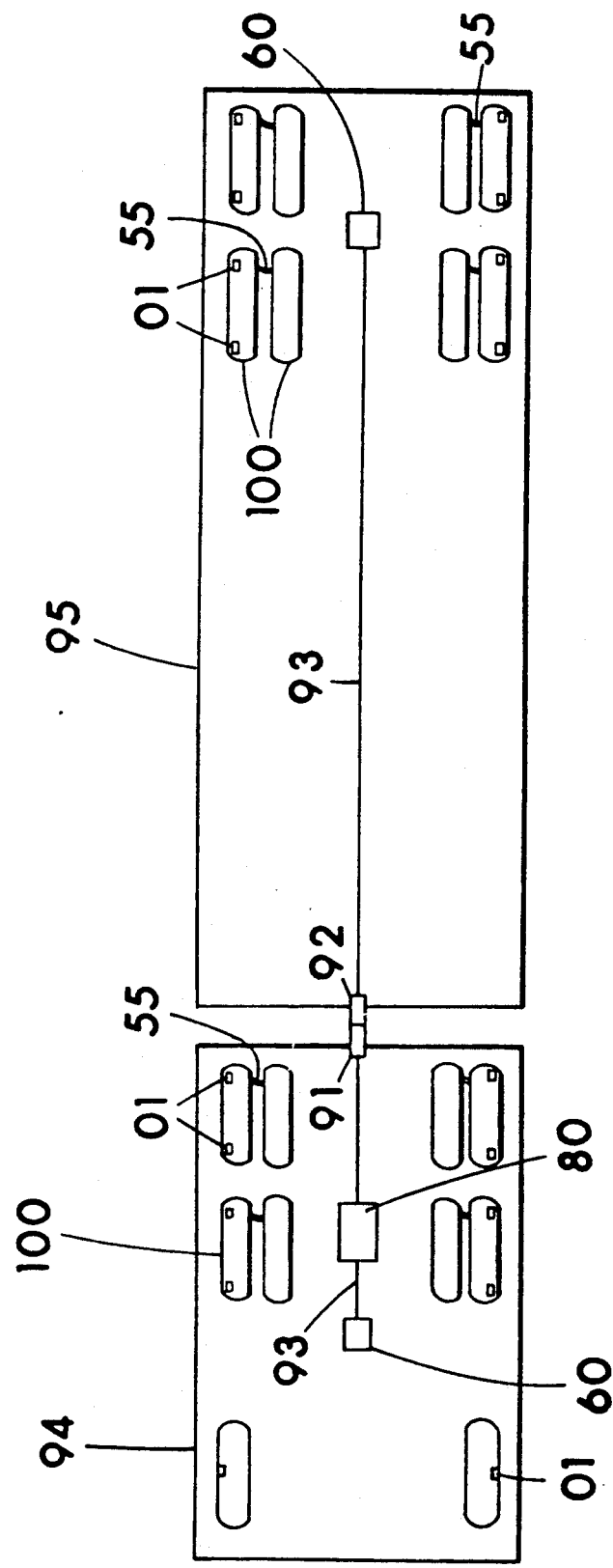
FIG. 8 is an illustrative drawing showing the relative location of the major individual components of the immediate invention on a typical tractor/trailer installation.

FIG. 8 shows a typical installation of my tire monitor or system on a truck tractor 94 with attached trailer 95. Two wheel attachable units 01 are mounted on each outside dual wheel 100. One wheel attachable unit 01 is connected by a tube 55 to the valve of the outside wheel, and one wheel attachable unit 01 is connected by a tube 55 to the valve of the inside wheel 100 using adapters 56. This mounting arrangement applies to both the tractor 94 and trailer 95 shown in the drawing. For a single wheel application, one wheel attachable unit 01 is attached to the wheel 100 and interconnected with tube 55 to the wheel valve stem by an adapter 56.

Referring now mainly to FIGS. 1, 2, 3, and 10 primarily in order to further detail encoder 18 with DIP switch buss 70. The functions of encoder 18, DIP switch buss 70 which includes 18 individual DIP switches 75, and the assignment of operating functions to each of the encoder 18 segments 71, 72, 73, and 74 are illustratively depicted best in FIG. 10. When high or low tire air pressure is sensed, electrical current passes from battery 12 via one of the contact sets 39 or 41 of pressure sensor 30 or 40 via switched leg 32-1, 32-2, or 42-1, 42-2 dependant upon the circuitry and whether high or low tire pressure has been sensed. The current may flow first through on/off switch 13 or first into timer 15 depending upon the type and location of switch 13 in the circuit. In either case, the switched legs from the sensor 30 and 40 are maintained effectively electrically separate from one another until high or low pressure 73 segment has been initiated. Once high or low pressure 73 segment is initiated, a digital or bit code of 0's and 1's is generated. Due to the maintained electrical separation of the switch legs, the 2 bit high or low pressure 73 status segment generates the 0's and 1's in an order and number representing either a high or low pressure status of the tire 102 responsible for triggering the activated pressure sensor 30 or 40. The order of the generation and the number of the 0's and 1's generated is dependant on the setting of the two DIP switches 75 of that segment 73. In any case, this information may ultimately lead via vehicle attachable unit 60 to either a LED 87 or LED 88 in display 80 being activated, or both LED's 87 and 88 in a low battery condition, wherein low voltage detector 10 simulates both a high and a low pressure signal into high or low pressure 73 segment.

The current from one of the switched legs of contacts 39 or 41 of the activated pressure sensor 30 or 40 is additionally utilized to initiate a digital or bit code generation of 0's and 1's in the 5 bit wheel identification 74 segment. With the various possible combinations of these 5 bits, 32 individual wheels can be identified on a display 80. In segment 74, the particular digital or bit code generated depends on the set positions of 5 DIP switches 75. This generated code will ultimately initiate a display in display 80 which will alert the vehicle operator of the particular wheel number and position thereof having incorrect pressure, and when combined with the information from high or low pressure status 73 segment, the operator will also be alerted to whether the identified wheel (tire) has high or low air pressure.

The electrical current from one of the switched legs of contacts 39 or 41 of pressure sensors 30 or 40 is additionally utilized to initiate a digital or bit code generation of 0's and 1's in the 11 bit source identification 72 segment. In source identification 72 segment, the particular digital or bit code generated depends on the set positions of 11 DIP switches 75, and could be all 0's or all 1's depending on the switch 75 settings, as is the case with segments 73 and 74. The generated code from source identification 73 segment will allow the vehicle attachable unit 60 to identify by comparison, the transmitting wheel attachable unit 01 as being on the same vehicle. The 11 bits of source identification 72 segment allows the setting of over 2000 different source identification codes. For tractor-trailer application the first 5 bits should be assigned to tractor identification and the remaining 6 bits should be assigned to trailer identification. Using this approach, generally any tractor 94 could be hooked to any trailer 95 without concern that the tractor and the trailer source identifying codes would be in conflict.

Additionally, the electrical current from one of the switched legs of contacts 39 or 41 of pressure sensors 30 or 40 is utilized to initiate a single alert bit generation in the alert bit 71 segment. The alert bit function is to notify receiver 61 of vehicle attachable unit 60 that a signal is being transmitted by the transmitter 14, but other than that carries no information. The generated information of segments 71, 72, 73, and 74 of encoder 18 is communicated with transmitter 14 and transmitted via antenna 19. The alert bit is the first to be transmitted, and is followed by the source identification bits of the bit string.

The number of bits within any of the segments of encoder 18 previously described could be expanded if necessary. Additionally, the "generated" digital information from encoder 18 could conceivably be read from a mini-computer within wheel attachable unit 01, although reading from a mini-computer seems far less desirable, considering the current level of technology, than generating the digital information upon demand.

Figure 9:
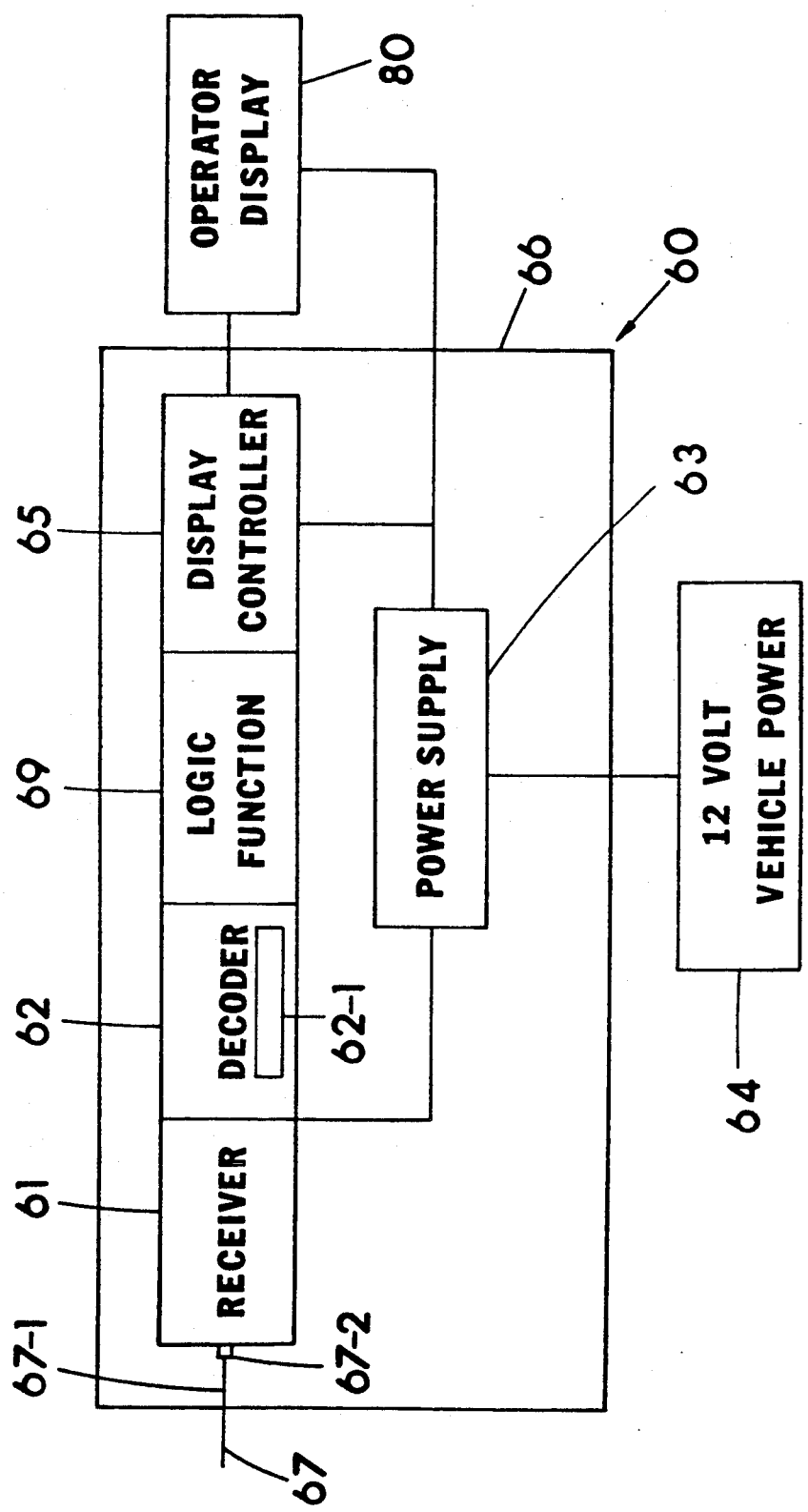
FIG. 9 is a block diagram illustrative of the primary electrical components of the vehicle attachable unit attachable to a vehicle remote of the wheels in accordance with the immediate invention.

Vehicle attachable unit 60, shown best in FIG. 8 and 9, would be mounted in a suitable protective housing indicated at 66 which may be mounted to the vehicle using any suitable manner. Vehicle attachable unit 60 has a primary function to receive the RF signal from a transmitting wheel attachable unit 01, and process the RF signal so it may be displayed for the operator on display 80. Vehicle attachable unit 60 includes a wire whip antenna 67 connected to RF receiver 61 by coax cable 67-1 and a coax connector 67-2. RF receiver 61 receives the RF signal and sends the signal to the decoder 62. Decoder 62 includes a DIP switch buss 62-1 similar to DIP switch buss 70 of wheel attachable unit 01. DIP switch buss 62-1 also includes a plurality of individual DIP switches, and in this example of the invention, has 11 source identification DIP switches, an equal number to that of wheel attachable unit 01. DIP switch buss 62-1 does not however have any wheel identification, or high or low pressure DIP switches. In place of the seven DIP switches for the high or low pressure and wheel identification, a logic function 69, such as a microprocessor is used to manipulate the incoming information from decoder 62 and relay it to display controller 65. Microprocessors are currently used in many applications and are mass produced in relatively large numbers.

As in transmitter 14 and encoder 18, receiver 61 and decoder 62 are an integral unit. The 11 DIP switches of DIP switch buss 62-1 would be set the same as the 11 source identification DIP switches of wheel attachable unit 01 assuming both units 01 and 60 are mounted or to be mounted on the same vehicle. A signal from wheel attachable unit 01 would be received by the receiver 61, then communicated to decoder 62 where a comparison will be made only between the digitized portion of the information received from wheel attachable unit 01 pertaining to source identification by decoder 62. If the source identification information from wheel attachable unit 01 is the same or is recognized by decoder 62, then the information identifying the wheel by designated number, and the pressure condition of the identified wheel whether high or low will be sent to display controller 65 where it is converted to a signal for display 80. If the source identification information is not the same and thus not recognized by decoder 62, then no information will be sent to display controller 65 and display 80.

Display controller 65 may a part of the display 80, or may be separated from the display 80 and within vehicle attachable unit 60, as in this case. Vehicle attachable unit 60 uses vehicle source power 64 which is nominally 6, 12, or 24 volts, depending on the type of vehicle. In order to use this power, a power supply 63, is required to modify the voltage to a voltage compatible with vehicle attachable unit 60 which is nominally 9 volts.

In FIG. 8, two vehicle attachable units 60 are mounted one each on tractor 94 and trailer 95. An operator display 80 is mounted in a visible position for the vehicle operator. The vehicle attachable unit 60 of trailer 95 is mounted under the trailer 95 and is connected by a shielded electrical cable 93 through male 91 and female 92 connectors to the display 80 in tractor 94. The tractor vehicle attachable unit 60 is mounted under the tractor 94 and is connected to the display 80 in the tractor 94 by a shielded electrical cable 93. The 12 or 24 volt power supply 64 is not shown except where indicated in FIG. 9 as it is integral to the tractor 94.

When a wheel attachable unit 01 transmits, and the signal is received and the source identification code is recognized as being compatible by vehicle attachable unit 60, the information will be sent to display 80 at 5 second intervals, and will indicate the wheel (tire) with the incorrect air pressure. The wheel with incorrect tire pressure will be identified by the activation of either a red LED 87 or green LED 88 placed adjacent a printed or otherwise indicated wheel having a wheel number placed therein. Printed wheel symbols with wheel numbers therein, designated by 82 are shown in the FIG. 11 drawing of display 80. The signal will continue until the battery 12 is depleted, however the low voltage detector 10 will first detect a low voltage and send the proper signal to activate both LEDs 87 and 88 over the same identified wheel, alerting the driver battery 12 will cease supplying power in the near future and the battery 12 has reached a marginal operating point. FIG. 11 shows a functional display 80 configuration for a tractor-trailer combination. The display 80 is comprised of a display section assigned to tractor 94, and a second portion assigned to trailer 95, with each section having a plurality of wheels with designated wheel numbers shown at 82. The shown wheels with designated numbers are placed somewhat realistically relative to a 18 wheel tractor with trailer for ease in readily identifying the physical position a given tire on the vehicle. Additionally included as part of display 80 is an on/off switch 89 to be used to deactivate the total display 80 at the users discretion. Also included is an audio warning 83 which is used to gain the operator's attention when one or more LEDs 87 or 88 are activated. A volume control 85 is provided to attenuate the volume level of audio warning 83 from a "wake up" call to "off".

In the wheel attachable unit 01, timer 15 causes a message to be sent every 5 seconds in the event an anomaly in pressure exists. The display 80 incorporates an auto "off" function on an 8 second interval. If no recurring signal is received within 8 seconds of the last signal, the display 80 will reset to a "zero status" where no LEDs are activated. In a system test mode the operator may reset the display 80 by pressing reset button 84 turning all LEDs off, and if the LED 87 or 88 is reactivated the operator will be assured the indication received is in fact a pressure or battery problem in the tire 102 of the indicated wheel. The display 80 may be expanded to accommodate a second trailer in a dual trailer mode. Ten more tire identifying numbers 82 would be added with the accompanying LEDs' 87 and 88. With 10 wheels on the tractor 94 and 8 wheels on the trailer 95, there remains 14 wheel identifying numbers 82 for other use such as an added trailer or spare wheels (tires) when 5 bits are utilized for wheel identification.

Although I have specifically described what I feel at this time is the best mode of carrying out the invention, it should be understood that the specific details are given only for example. Many changes in the specific details may be made without departing from the true scope of the invention, and therefore the scope of the invention is to be determined by the broadest reasonable interpretation of my appended claims.

What I claim as my invention is:

1. A tire pressure monitor having means to sense incorrect tire air pressure, and having means for generating digital information upon a sensed incorrect tire air pressure, and further having means of communicating at least in part via radio frequency transmitting and receiving of digital information pertaining to a sensed condition of incorrect tire air pressure to an operator of a vehicle during use of the vehicle, said means for generating digital information and said radio frequency transmitting being initiated by an air pressure sensor means of said tire pressure monitor, said tire pressure monitor further characterized in that, an air pressure conductive means for communicating air pressure within a tire with said air pressure sensor means includes air flow rate restricting means for preventing transitory air pressure changes within a tire from activating said air pressure sensor means, and thereby preventing transitory air pressure changes from falsely initiating said means for generating digital information and said radio frequency transmitting, said restricting means comprising a narrow passage through a side wall of a longitudinal manifold mounted to a tire air pressure source, said passage arranged perpendicular to the longitudinal axis of the manifold, and being connected to a chamber communicating with the tire air pressure source at a first end and a chamber communicating with the air pressure sensor means at the opposite end.

2. A tire pressure monitor structured to be essentially free of false signals and having means for sensing at least a low air pressure value of a pneumatic tire on a vehicle, and alerting an operator of the vehicle of a tire air pressure condition below a given value, said tire pressure monitor comprising:

(a) a wheel attachable unit including, a protective housing;

a low air pressure sensor means contained at least partially within said housing, said low air pressure sensor means including means for effecting electrical current flow in electronic means contained at least partially within said housing;

air pressure conductive means for communicating air pressure within a pneumatic tire with said low air pressure sensor means, said air pressure conductive means including air flow rate restricting means for preventing transitory air pressure changes within a tire from activating said low air pressure sensor means;

an electrical power source contained at least partially within said housing, said electrical power source providing means for supplying electrical power to said electronic means;

said low air pressure sensor means including means for activating said means for effecting electrical current flow upon communication with tire air pressure below a low pressure value;

said electronic means including digital information generating means for generating digital information upon electrical current being effected by said means for effecting electrical current flow of said low air pressure sensor means, said digital information generating means including means for producing said digital information at least containing information identifying a specific tire responsible for activating the effected current flow from said low air pressure sensor means, said digital information further containing source indicating information capable of identifying said wheel attachable unit as being on a given vehicle;

said electronic means further including a radio frequency transmitter means and antenna in communication with said digital information generating means for transmitting said digital information to (b) a vehicle attachable unit, said vehicle attachable unit including electronic means connectable to an electrical power source for operational power, said electronic means of said vehicle attachable unit including a radio frequency antenna and receiver means for receiving said digital information from said wheel attachable unit, said electronic means of said vehicle attachable unit further including a digital information processing means in communication with said receiver means, said digital information processing means being operative exclusively with said source indicating information from at least one said wheel attachable unit on a same given vehicle as said vehicle attachable unit so as to specifically prevent said digital information received from a wheel attachable unit on another vehicle from being fully processed by said digital information processing means, said electronic means of said vehicle attachable unit further including means for communicating information pertaining to said digital information to (c) a communication device positionable convenient to an operator of a vehicle, said communication device including means cooperative with said electronic means of said vehicle attachable unit to provide means for presenting information to an operator of a vehicle indicating a specific tire of the vehicle having a tire air pressure condition below a given value.

3. A tire pressure monitor according to claim 2 further including means for sensing a high air pressure value of a pneumatic tire on a vehicle, and presenting information via said communication device to an operator of the vehicle of a tire air pressure condition above a given value.

4. A tire pressure monitor structured to be essentially free of false signals and having means for sensing high and low air pressure values of a pneumatic tire on a vehicle, and alerting an operator of the vehicle of a tire air pressure condition outside a given value range, said tire pressure monitor comprising:

(a) a wheel attachable unit including,
   a protective housing;
   a high air pressure sensor means contained at least partially within said housing, said high air pressure sensor means including means for effecting electrical current flow in
   electronic means contained at least partially within said housing;
   air pressure conductive means for communicating air pressure within a pneumatic tire with said high air pressure sensor means, said air pressure conductive means including air flow rate restricting means for preventing transitory air pressure changes within a tire from activating said high air pressure sensor means;
   a low air pressure sensor means contained at least partially within said housing, said low air pressure sensor means including means for effecting electrical current flow in said electronic means;
   air pressure conductive means for communicating air pressure within a pneumatic tire with said low air pressure sensor means, said air pressure conductive means including air flow rate restricting means for preventing transitory air pressure changes within a tire from activating said low air pressure sensor means;
   an electrical power source contained at least partially within said housing, said electrical power source providing means for supplying electrical power to said electronic means;
   said high air pressure sensor means including means for activating said means for effecting electrical current flow upon communication with tire air pressure exceeding a high pressure value;
   said low air pressure sensor means including means for activating said means for effecting electrical current flow upon communicating with tire air pressure below a low pressure value;
   said electronic means including digital information generating means for generating digital information upon electrical current being effected by said means for effecting electrical current flow of at least one of said air pressure sensor means, said digital information generating means including means for producing said digital information at least containing information identifying a specific tire and air pressure condition of the specific tire responsible for activating the effected current flow from one of said air pressure sensor means, said digital information further containing source indicating information capable of identifying said wheel attachable unit as being on a given vehicle;
   said electronic means further including a radio frequency transmitter means and antenna in communication with said digital information generating means for transmitting said digital information to (b) a vehicle attachable unit, said vehicle attachable unit including electronic means connectable to an electrical power source for operational power, said electronic means of said vehicle attachable unit including a radio frequency antenna and receiver means for receiving said digital information from said wheel attachable unit, said electronic means of said vehicle attachable unit further including a digital information processing means in communicating with said receiver means, said digital information processing means being operative exclusively with said source indicating information from at least one said wheel attachable unit on a same given vehicle as said vehicle attachable unit so as to specifically prevent said digital information received from a wheel attachable unit on another vehicle from being fully processed by said digital information processing means, said electronic means of said vehicle attachable unit further including means for communicating information pertaining to said digital information to (c) a communication device positionable convenient to an operator of a vehicle, said communication device including means cooperative with said electronic means of said vehicle attachable unit to provide means for presenting information to an operator of a vehicle indicating a specific tire and air pressure condition of the specific tire of the vehicle.

5. A tire pressure monitor according to claim 4 further including a plurality of multi-position electrical switches in communication with said electronic means of said wheel attachable unit, said multi-position electrical switches of said wheel attachable unit providing means for allowing field setting of said digital information, and specifically said information identifying a specific tire and said source indicating information,
   said tire pressure monitor further including a plurality of multi-position electrical switches in communication with said electronic means of said vehicle attachable unit, said multi-position electrical switches of said vehicle attachable unit providing means for allowing field setting of said digital information processing means.

6. A tire pressure monitor according to claim 5 further including adjustable means on said low air pressure sensor means for setting of said low pressure value necessary for activating said means for effecting electrical current flow of said low air pressure sensor means, and further including adjustable means on said high air pressure sensor means for setting of said high pressure value necessary for activating said means for effecting electrical current flow of said high air pressure sensor means.

* * * * *